United States Patent [19]

Cummings

[11] 4,124,496
[45] Nov. 7, 1978

[54] SEPARATION OF MULTI-COMPONENT MIXTURES

[76] Inventor: Donald R. Cummings, Anchor Cottage, Coln St. Dennis, Cheltenham, England

[21] Appl. No.: 818,337

[22] Filed: Jul. 22, 1977

[30] Foreign Application Priority Data

Jul. 28, 1976 [GB] United Kingdom ............... 31471/76

[51] Int. Cl.$^2$ ........................... C10G 7/00; B01D 3/06
[52] U.S. Cl. ..................................... 208/361; 208/351
[58] Field of Search ............................... 208/351, 361

[56] References Cited

U.S. PATENT DOCUMENTS

| 2,765,045 | 10/1956 | Meyers | 183/2.7 |
| 2,885,356 | 5/1959 | Fisher | 208/361 |
| 3,784,466 | 1/1974 | Arnold et al. | 208/361 |

OTHER PUBLICATIONS

Mitchell, "The Chemical Engineer", Jun., 1975, pp. 361 to 364.

Primary Examiner—Herbert Levine
Attorney, Agent, or Firm—Browdy and Neimark

[57] ABSTRACT

An improvement in the separation of a multi-component mixture, especially a well head stream, into gaseous and liquid phases by multi-component flash separation at reducing pressures, comprises recycling at least a part of the gaseous fraction recovered from a stage after the first stage to a preceding stage, and preferably the immediately preceding stage, to mix with the liquid phase which is separated in said preceding stage and at substantially the pressure of said preceding stage. This (a) increases the gas/liquid ratio in each stage, the amount of liquid recovered from the last stage and the proportion of medium-boiling components therein; (b) results in more gas being available from the higher pressure stages and (c) yields gases having narrower boiling ranges. Three separation stages are preferred and pipeline gas, crude LPG and a local fuel gas to supply the energy requirements of the separation can be derived from the gaseous fractions recovered from the separation stages.

19 Claims, 3 Drawing Figures

SEPARATION OF MULTI-COMPONENT MIXTURES

FIELD OF THE INVENTION

This invention relates to the separation of multi-component mixtures such as naturally occurring hydrocarbons into liquid and gaseous fractions.

BACKGROUND OF THE INVENTION

Generally, naturally occurring hydrocarbons exist under pressure underground and are extracted at pressure via wells, but the well streams contain, in addition to hydrocarbons, water and solids. Moreover, there is generally present in the hydrocarbons dissolved methane, ethane and propane and heavier gases in addition to the possible presence of one or more normally gaseous components such as nitrogen, helium, carbon dioxide and hydrogen sulphide.

In remote locations on land, all or part of the above gases must be removed to produce a liquid which is pumpable and readily stabilized to produce a crude oil suitable for ultimate transport at atmospheric pressure by road or sea tanker.

In off-shore locations where the loading of tankers from production platforms is envisaged, a substantial part of the above gases must be removed in order to produce a shippable crude liquid capable of being safely transported at or near atmospheric pressure in the tanks of a ship For off-shore locations with oil pipelines and for other locations it may be desirable to produce a crude having a finite vapor pressure above atmospheric but it is nevertheless desirable to recover the maximum amount of the well head stream in the liquid phase.

There are many process options possible for the gas/liquid separation and it is possible by flash separation of the mixture and treatment of the recovered gases by distillation at low temperature and/or high pressure with the use of an oil wash to make a very good separation between the $C_1$ and $C_2$ or $C_2$ and $C_3$ or $C_3$ and $C_4$ fractions and by remixing of the crude from the flash separation with the separated and recovered liquids from the gas fractions to extract the maximum possible percentage of light fractions for inclusion in the recovered liquid phase without exceeding a given vapor pressure for a given temperature of the liquid. However, the above distillation procedures require complex and bulky processing equipment and would normally require the inclusion of a fired heater and at least one and possibly more distillation columns. Such equipment is not suitable for remote locations or for the limited space and load carrying capacity of off-shore platforms.

Generally, naturally occurring hydrocarbons are separated at or near the well head in gas/oil separator units which usually consist of one or more flash separation stages. FIG. 1 of the accompanying drawings shows a schematic arrangement of a typical gas oil separator containing three separator stages 2, 4, 6, and in which well stream fluid under high pressure supplied via pipeline 8 is expanded into the first, or high pressure, separator 2 via a throttle valve 10. The high pressure separator generally separates three phases; water and solids such as sand which settle in the base of the separator and are removed via pipeline 12 and valve 14; liquid hydrocarbons which are recovered in pipeline 16, expanded in a throttle valve 18 and then fed into the second, or medium pressure, separator 4 and high pressure gas which is drawn off through pipeline 20 and valve 22.

In the medium pressure separator 4 medium pressure gas is withdrawn through pipeline 24 and valve 26 and liquid is withdrawn through pipeline 28, expanded in throttle valve 30 and fed into the third, or low pressure, separator 6 from which low pressure gas is removed through pipeline 32 and valve 34 and liquid at the desired vapor pressure is recovered via pipeline 36 and valve 38.

Flash separation as shown does not give as good a separation of gas and liquids as the aforementioned distillation plus oil wash. Increasing the number of flash separation stages provides an improvement in separation where liquid of a given vapor pressure is required as the end product but in general the use of more than four stages is not considered to be economic.

The gas from the high pressure separator 2 is relatively lean in higher boiling components such as propane, butane and heavier hydrocarbons and is furthermore generally at a sufficiently high pressure to be used e.g. as a gas turbine fuel without further pressurization. The gases from the medium and low pressure stages contain increasing concentrations of higher boiling components and are at lower pressures which are generally too low for the gases to be usable without recompression. The higher boiling components in these lower pressure gas streams represent a loss of valuable hydrocarbons which could be contained in the liquid if a better method of separation could be devised and if the liquid contained a lower percentage of the very light hydrocarbons such as propane, ethane and methane which have an increasing effect on the vapor pressure of the liquid per unit percent that they are present in the liquid. However, for use in remote locations on land or in off-shore locations any such improvement must be achieved without substantial increase in the complexity or cost of the plant.

SUMMARY OF THE INVENTION

According to the present invention, there is provided an improvement in the separation of a multi-component mixture into a gaseous phase and a liquid phase by a multi-stage flash separation in which each stage operates at a lower pressure than the preceding stage and the feed to each of the separation stages after the first is provided by the liquid fraction recovered from the immediately preceding stage, the improvement comprising recycling at least a part of the gaseous fraction recovered from a stage after the first stage to a preceding stage to mix with the liquid phase which is separated in said preceding stage and at substantially the pressure of said preceding stage.

The multi-stage flash separation may comprise two or more than two flash separation stages. Where the separation is effected in three or more stages, the recycle of the gaseous phase recovered from a separation stage may be applied to one, or more than one, of the separation stages after the first stage, and for maximum benefit is preferably applied to all the stages after the first.

It is also preferred that the recycle be to the immediately preceding stage.

Whereas the invention is applicable to any mixture containing components having differing boiling points and can be applied to mixtures supplied at atmospheric, sub-atmospheric or superatmospheric pressures, it finds particular use in the separation of naturally occurring hydrocarbon mixtures, especially well-head streams.

The recycling of gas from one or more of the separation stages to a preceding stage or stages in accordance with the invention results in general increases in the ratios of gas phase to liquid phase resulting from the separation occurring in each of these stages and enrichment of the composite feed streams to these stages in the medium boiling components as compared with a conventional multi-stage separation without recycle but operating under otherwise identical conditions. This enrichment of the feed streams results in enrichment of the liquid streams leaving these stages such that in a separation system operating with recycle in accordance with the invention the liquid leaving the last stage, for the same vapor pressure as the corresponding liquid from systems operating under identical pressure conditions but without the recycle, is greater in amount and contains an increased percentage and absolute amount of the medium to heavy boiling components (such as propane, butane and heavier components when the mixture under treatment is a naturally occurring well stream). Correspondingly, the total net gas separated is less in quantity and contains a lower percentage and absolute amount of these medium to heavy boiling components. Thus, the separation in accordance with the invention is more efficient with regard to liquid recovery than the conventional multi-stage separation without gas recycle and also conventional multi-stage separation wherein condensate formed by recompressing the gas from each stage is recycled to the separator system.

Furthermore, in addition to recovering a higher percentage of liquids, a higher percentage of the gas leaving the separation system is from the higher pressure stages and thus available at pressures at which it may more readily be employed subsequently as a process or fuel gas, or at which the requirements for further compression, e.g. for pipeline transmissions, are reduced.

Recycling gases recovered from one separation stage to a preceding stage in accordance with the invention also produces a counter-current washing or distillation effect. This results not only in the better gas/liquid separation just described but also in the gaseous fraction recovered from each stage having a narrower boiling range than in the case of conventional multi-stage flash separation without recycle. This means that in the process of this invention the gas recovered from one stage and recompressed to the pressure of the preceding stage will on cooling produce a greater quantity of condensate of given boiling range than is obtainable by the compression and after-cooling of the gas recovered from the corresponding stage in conventional multi-stage flash separation.

Similarly, if a part of the gas recovered from one stage of a separation in accordance with this invention is removed as a side stream, this side stream will have a narrower boiling range than the corresponding side stream from a conventional multi-stage flash separation. Moreover, the quality and quantity of side streams which may be removed by operation in accordance with the present invention are greater than those possible from conventional multi-stage flash separation unless additional treatments such as gas chilling, oil washing and/or distillation are employed.

Although the first, or highest pressure, separation stage of the process may be at a pressure e.g. of 50 to 6000 psig, it will more generally be in the range 50 to 2000 psig. As a general rule, gas recovered from a subsequent lower pressure separation stage will not be recycled to the first separation stage in accordance with the invention if the pressure in said first stage is above 2000 psig, and in most cases the highest pressure for which such recycle is suitably employed will be in the range 500–1000 psig. If the separation stage to which the gas would be recycled is operating at any higher pressure, the quality of the gaseous fraction recovered from this high pressure separation stage tends to deteriorate and may be unsuitable for pipeline transmission. Moreover, improving the quality by conventional techniques is difficult because of the reduced relative volatilities of the various components at these high pressures. In this case, it will generally be preferred first to throttle the feed to the first separation stage to a lower pressure, e.g. by means of an expansion valve or expansion turbine, before conducting the multi-stage flash separation process of this invention.

Particular advantages are obtained by the process of this invention if the gas being recycled is combined after repressurization with the expanded liquid feed to the stage to which the said gas is being recycled and this benefit is enhanced by intimate mixing of the recycled gas and the liquid. The liquid acts as a coolant and thus reduces or eliminates the need for a separate after-cooler to remove the heat of compression from the repressurized gas.

In accordance with a preferred embodiment of the invention, where the mixture to be separated is supplied at elevated pressure the potential pressure energy in the liquid feed to any stage, prior to expansion of said liquid feed to the pressure of said stage, may be utilized, e.g. by employment of a gas/liquid type ejector nozzle or nozzles, to promote intimate mixing between said liquid and gas being recycled to said stage from a later stage.

In a further preferred embodiment, where the mixture to be separated is supplied at elevated pressure the potential pressure energy in the liquid feed to any stage may be utilized, e.g. by means of a gas/liquid ejector nozzle or nozzles, to provide at least a part of the necessary compression energy required to repressurize gas being recycled to said stage during expansion of said liquid feed to the pressure of said stage. In this way, where the mixture to be separated is provided at elevated pressure, the potential pressure energy thereof may be used to reduce the equipment requirements for repressurizing the recycling gas stream or streams.

Where the process of the invention is applied to the separation of a well oil whose recovery from the ground is assisted by means of gas lift, i.e., where gas is pumped down into the well and a mixture of this gas and the oil is recovered from the well, the gas which is pumped down the well for this purpose may comprise at least a portion of the gaseous phase recovered from the second separation stage, after compression of said portion to an appropriate pressure. In this embodiment of the invention, it may be desirable to augment the gas being pumped down the well with gas provided from the gaseous fraction resulting from the first separation stage.

Where the mixture to be separated comprises a wax-containing well stream, the process of the invention may be adapted to reduce the rates of deposition of wax on apparatus surfaces with which the liquid recovered from the last separation stage comes into contact. In accordance with this embodiment, at least a portion of the gaseous fraction recovered from the final separation is compressed, cooled and at least partially liquefied and at least a part of the condensate so obtained is mixed with the feed to the last separation stage thereby in effect providing open-circuit homogeneous refrigeration of the feed to the last separation stage. The amount of refrigeration is chosen to cool the said feed below the cloud point of the wax which is thus converted into a crystalline form which can be contained in the liquid oil as a suspension and is less likely to deposit on surfaces which said liquid contacts during subsequent processing.

As indicated above, the gas streams recovered from a crude oil well stream by means of this invention have narrower boiling ranges than those obtained by conventional multi-stage flash separation and accordingly sidestreams valuable for specific functions such as fuel gas or LPG are more readily derived from them.

For example, where the mixture to be separated is a well stream containing $C_1$-$C_4$ hydrocarbons, a gas stream rich in $C_1$ and suitable for use as a pipeline gas may be derived from the gaseous fraction recovered from the first separation stage. Similarly, a stream suitable as a crude LPG stream may be provided from condensate formed by partially condensing a gas stream provided by at least one of the gaseous fractions recovered from a stage of the multi-stage flash separation after the first stage.

It is also possible to recover from at least one of the gaseous fractions recovered from the multi-stage flash separation a stream having a composition lying between that of the gas stream suitable for use as a pipeline gas and the stream suitable as a crude LPG stream, for use as a fuel gas.

In a particular embodiment involving at least three flash separation stages the gas stream suitable as a pipeline gas may be obtained from the first stage, by removing e.g., high boiling components from said fraction by partial condensation at low temperatures (i.e., below ambient). The cooling required to effect the partial condensation may suitably be effected by heat exchange with a refrigerant stream which is conveniently derived by expanding liquid obtained by partially condensing at least a portion of the gaseous fraction recovered from the second separation stage. Conveniently, this liquid may be formed by cooling and partially condensing that portion of the gaseous fraction from the second separation stage which has been recompressed for recycle to the first separation stage. The residual gas is then recycled to the first separation stage.

This liquid, or a portion thereof, may also be recovered from the plant as a crude LPG stream.

After heat exchange with the gaseous fraction from the first separation stage, the above-mentioned refrigerant stream may be combined with the gaseous fraction formed in the third separation stage, for recompression and subsequent recycle to the second separation stage.

The condensate resulting from the above-mentioned partial condensation of the gaseous fraction from the first separation stage may be employed as a fuel gas, e.g. for combustion in a prime mover to provide at least a part of the energy requirements of the multi-stage separation process, especially for recompressing the recycling gas streams. If desired, this condensate may first be expanded whereby to condense out a heavier fraction which may conveniently be combined with repressurized gas being recycled to the second separation stage.

Another portion of the condensate resulting from the partial condensation of the gaseous fraction from the first separation stage may be expanded to provide a further refrigerant stream for cooling said gaseous fraction and yet another portion may be expanded and combined with the refrigerant stream provided from the condensate derived by partial condensation of the recompressed gaseous fraction from the second separation stage.

BRIEF DESCRIPTION OF THE DRAWINGS

The invention is now illustrated with reference to two embodiments thereof and with the aid of FIGS. 2 and 3 of the accompanying drawings in which.

DESCRIPTION OF PREFERRED EMBODIMENTS

Figure 2:
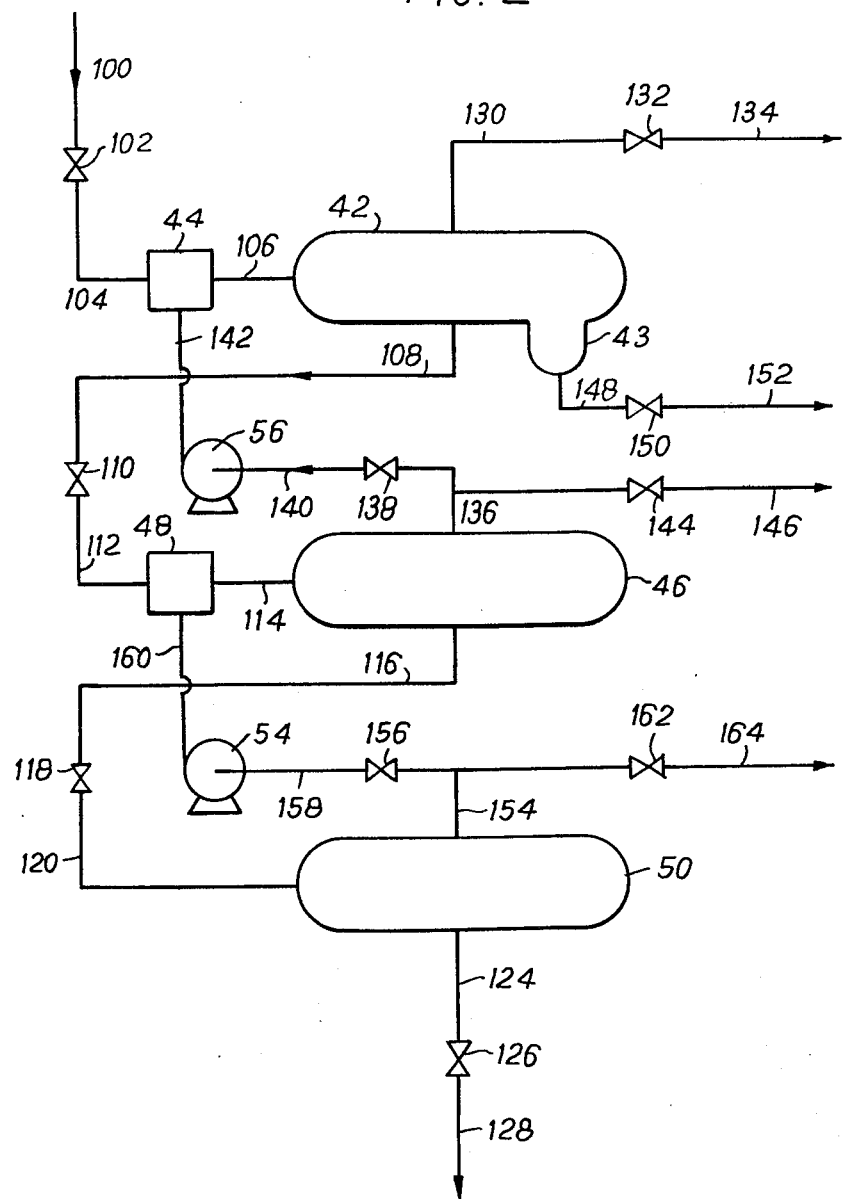
FIG. 2 illustrates a simple three-stage flash separation system in accordance with the present invention for the separation of a crude oil well stream into crude of the required vapor pressure, by-product gas, waste water and solids.

Referring to FIG. 2 of the drawings, 42 is a high pressure three phase separator having a sump 43, 46 is a medium pressure separator and 50 is a low pressure separator. 44 and 48 are gas/liquid mixing devices (ejectors) and 54 and 56 gas compressors, fans, blowers or similar gas compressing units. Compressors 54 and 56 may, if desired, have aftercoolers; however, this may not be necessary.

Well stream fluid under pressure enters through pipe 100 and is throttled by valve 102. In addition, there may be fixed orifices, not shown, in the line, to provide additional flow control. Fluid leaving valve 102 passes via pipeline 104 to the gas/liquid mixer 44 which is an ejector or ejectors designed to utilize part of the pressure energy of the fluid in line 104 to cause intimate mixing of the fluid with recycle gas entering by pipeline 142 and possibly aid in compression of said gas before ejecting the gas and liquid mixture through pipe 106 into the three phase high pressure separator 42. In the separator 42, water and sand and other solids settle in the sump 43 and are withdrawn via pipeline 148, valve 150 and pipeline 152. Liquid hydrocarbons from an upper layer are withdrawn via pipeline 108 and valve 110 and gas is bled off via pipeline 130, valve 132 and pipeline 134. Valve 150 controls the water layer level; valve 110 controls the liquid hydrocarbon level and valve 132 the gas pressure in the separator. The lean gas in pipeline 134 can be suited for pipelining.

Liquid under pressure passes through valve 110 and pipeline 112 to gas liquid mixer 48 comprising an ejector or ejectors suitably designed to utilize part of the pressure energy of the fluid in line 112 to intimately mix it with the recirculated gas entering by pipeline 160 and also to compress the gas before ejecting the gas and liquid mixture through pipeline 114 into the medium pressure separator 46. In this separator, the liquid phase is separated and removed via pipeline 116 and valve 118 and gas is recovered via pipeline 136 which connects with pipeline 140 via valve 138 and with pipeline 146 via valve 144. Pipeline 140 is connected to the inlet of compressor 56 the outlet of which is connected to pipeline 142 leading to gas liquid mixer 44. Valve 118 controls the hydrocarbon liquid level in the medium pressure separator 46 and valve 138 and/or valve 144 and- /or compressor 56 control the gas pressure in the medium pressure separator 46.

The liquid in pipeline 116 passes through valve 118 and the gas/liquid mixture resulting from the pressure drop passes through pipeline 120 into the low pressure separator 50. The liquid phase separated therein is withdrawn via pipeline 124, valve 126 and pipeline 128. Valve 126 controls the liquid level in the low pressure separator 50 and the required volatility of the liquid is controlled by the pressure of operation of the separator. This liquid will be tankerable crude oil.

Gas from the low pressure separator is withdrawn via pipeline 154 which connects with pipeline 164 via valve 162 and with pipeline 158 via valve 156. Pipeline 158 is connected to the inlet of compressor, fan or blower 54 the outlet of which is connected to pipeline 160 which is connected at its other end to gas/liquid mixer 48.

In accordance with the invention, at least some of the gas from separator 50 is passed via valve 156 and pipeline 158 to the compressor fan or blower 54 where it is passed to gas/liquid mixer 48 in which it is intimately mixed with the liquid under pressure in pipeline 112 and returned to separator 46. The remainder of the gas from separator 50, if any, is passed via valve 162 and pipeline 164 for flaring or for recompression for use as a process or fuel gas or for use as a low pressure gas. Control of the gas pressure in the low pressure separator 50 is by control of any one of a combination of valves 162 and 156 and compressor 54.

It will be understood that the use of gas/liquid ejector 48 may reduce the compression energy required from compressor 54 under certain conditions.

Similarly in accordance with the invention, at least some of the gas from the medium pressure separator 46 which is withdrawn via pipeline 136 passes via valve 138 and pipeline 140 to the compressor fan or blower 56 by which it is passed in pipeline 142 to gas/liquid mixer 44 where it mixes with the pressurized liquid in pipeline 104 and is recycled to the high pressure separator 42. The remainder, if any, of the gas in pipeline 136 is passed via valve 144 and pipeline 146 for use as a medium pressure gas, or for external compression, or for flaring.

It will be understood that the use of gas/liquid ejector 44 may reduce the compression energy required from compressor 56.

The vapor pressure of the liquid recovered through pipeline 128 can be adjusted by adjusting the operating pressures of the separators by adjusting the operating temperatures by heating or cooling the liquid in lines 100, 108 and/or 116 and/or by heating or cooling the separator vessels themselves, e.g. by using internal or external heat exchangers.

Gas leaving the separation unit through any of pipelines 134, 146 and 164 may subsequently be further compressed and, by inter-cooling and/or after-cooling, further liquids may be recovered from them for recycling to the separators. The liquid or liquids so recovered, depending on their pressures and compositions, may be recycled to any one or more of the separators 42, 46 and 50.

If desired, the gas in pipeline 146 may be used as local fuel for combustion to provide at least some of the energy for the separation, e.g. to drive the compressors 54 and 56. If high pressure fuel gas is required, it may be taken from the outlet side of compressor 56. If the gas is cooled and partially condensed, the condensate may be recovered as a crude LPG stream.

Similarly, the sidestream in pipeline 164 may, if desired, be taken from the outlet side of compressor 54, cooled and further compressed and subsequently cooled and partially condensed to yield a mixed liquefied petroleum gas stream and the uncondensed gas may be employed as fuel gas.

Thus, a well stream may be treated in this manner to produce not only a tankerable crude oil, but also a lean gas well suited for pipelining as such or requiring relatively simple further treatment to produce a high grade pipeline gas. In addition, a crude LPG may also be produced as well as a fuel gas sidestream well suited for plant and well production fuel requirements.

For low gas-oil ratio well streams it is possible to produce three streams namely crude oil, crude LPG and local fuel.

The above possibilities which are achievable with simple plant arrangements as indicated make the system well suited to off-shore or remote location oil wells where maximum production of transportable product and reduction or elimination of flaring is desired.

Figure 3:
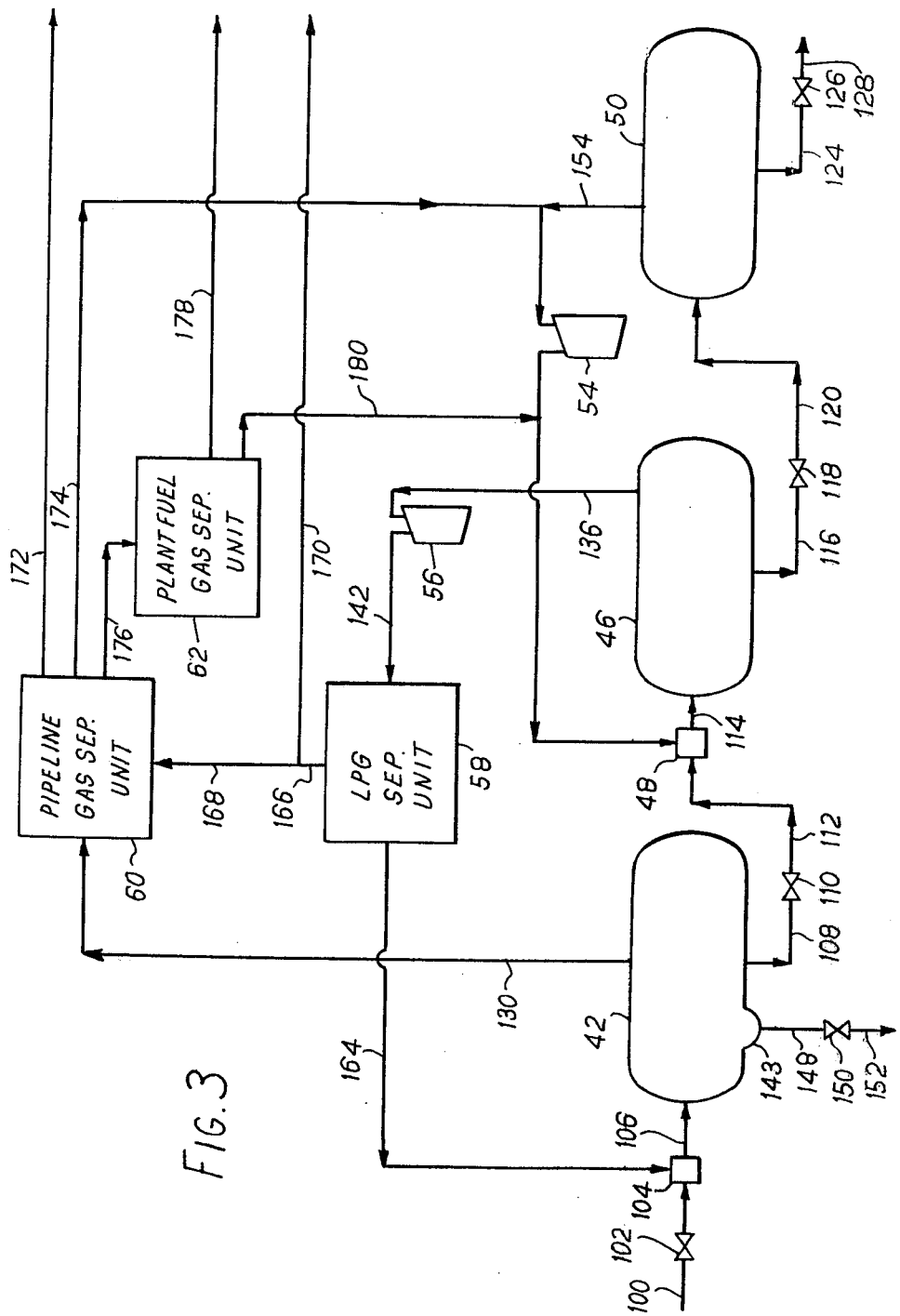
FIG. 3 illustrates a modification of the arrangement of FIG. 2 adapted to produce pipeline gas, LPG and a plant fuel gas.

FIG. 3 illustrates a modification of the arrangement of FIG. 2 for the co-production of crude LPG, pipeline gas and a fuel gas for local use. The apparatus features common with FIG. 2 are accorded the same reference numerals.

In addition, the arrangement includes a LPG separation unit indicated generally at 58, a pipeline gas separation unit indicated generally at 60 and a plant fuel gas separation unit indicated generally at 62.

As in FIG. 2, well stream fluid enters in pipeline 100, is expanded to a manageable pressure in valve 102 and then passed via ejector 104 into the first flash separator 42.

The gas formed by the first or high pressure flash separation in separator 42 and recovered in pipeline 130 is passed to the pipeline gas separation unit 60 in which it is first mixed with an ice inhibitor such as methanol and then cooled to low temperature, conveniently in an indirect countercurrent heat exchanger, and partially condensed and the gas/liquid mixture is separated in a low temperature separator. The gaseous fraction therefrom, which is rich in methane, is recovered in pipeline 172 and provides a pipeline gas for export from the plant. The liquid hydrocarbon fraction resulting from the partial condensation is divided into three portions. The first portion is recovered in pipeline 176 and passed to the plant fuel gas separation unit 62 where it is expanded and the gaseous and liquid fractions so formed are separated. The gaseous fraction is recovered in pipeline 178 and can conveniently be used as fuel for a prime mover to drive compressors 54 and 56. The liquid fraction is recovered in pipeline 180.

The second portion of the liquid fraction formed in the pipeline gas separation unit 60 is expanded and passed through the heat exchanger in countercurrent made with the stream in pipeline 130 to assist control of cooling the latter, and then combined with the stream in pipeline 176.

The third portion of the liquid fraction formed in the pipeline gas separation unit 60 is expanded and injected into the refrigerant stream for the heat exchanger and which is obtained in the manner described below, thus providing a mixed refrigerant stream.

The water/ice inhibitor phase recovered from the low temperature separator is sent for disposal or recovery of the inhibitor.

The gas recovered from the second flash separation unit 46 in pipeline 136 is recompressed in compressor 56 and passed via pipeline 142 to LPG separation unit 58 which comprises a cooler/condenser, where the compressed gas is cooled and partially condensed by indirect heat exchange with cold water, and a gas/liquid separator. The liquid recovered from this separator is removed in pipeline 166 and divided into two streams. The first, in pipeline 168, forms the above referred-to refrigerant for the heater exchanger in the pipeline gas separation unit 60 and this refrigerant is recovered from the unit 60 in pipeline 174. The second is recovered in pipeline 170 and exported from the plant as LPG.

The gas recovered from the gas/liquid separator in LPG separation unit 58 is recycled via pipeline 164 to the first flash separation stage in the manner described with reference to FIG. 2.

The gas recovered from the third flash separation stage in pipeline 154 is combined with the refrigerant in pipeline 174 and the combined stream is recompressed in compressor 54 and recycled to the second flash separation stage in the manner described with reference to FIG. 2 after combination with the condensate recovered from the plant fuel gas separation unit 62 in pipeline 180.

In a modification of the arrangement of FIG. 3, suitable for use where the feed is a wax-containing oil, an enlarged compressor 54 is employed and the compressed gas in pipeline 160 is aftercooled and partially condensed in a cooler (not shown). The uncondensed gas is returned to the mixer 48 as shown but the condensate is returned to the separator 50 with mixing preferably being done with the oil at the point of entry to the separator. Compressor 54 thus becomes a combined gas compression/refrigeration compressor. This homogeneous refrigeration system has the advantage of cooling gas substantially free from wax without wax deposit problems, and using the condenser as an indirect method of cooling the oil. If direct oil cooling were employed, wax deposition in the oil cooler could result in poor cooler performance or require a complex cooler/scraper system.

The invention is now further illustrated by the following Examples.

EXAMPLE 1

Figure 1:
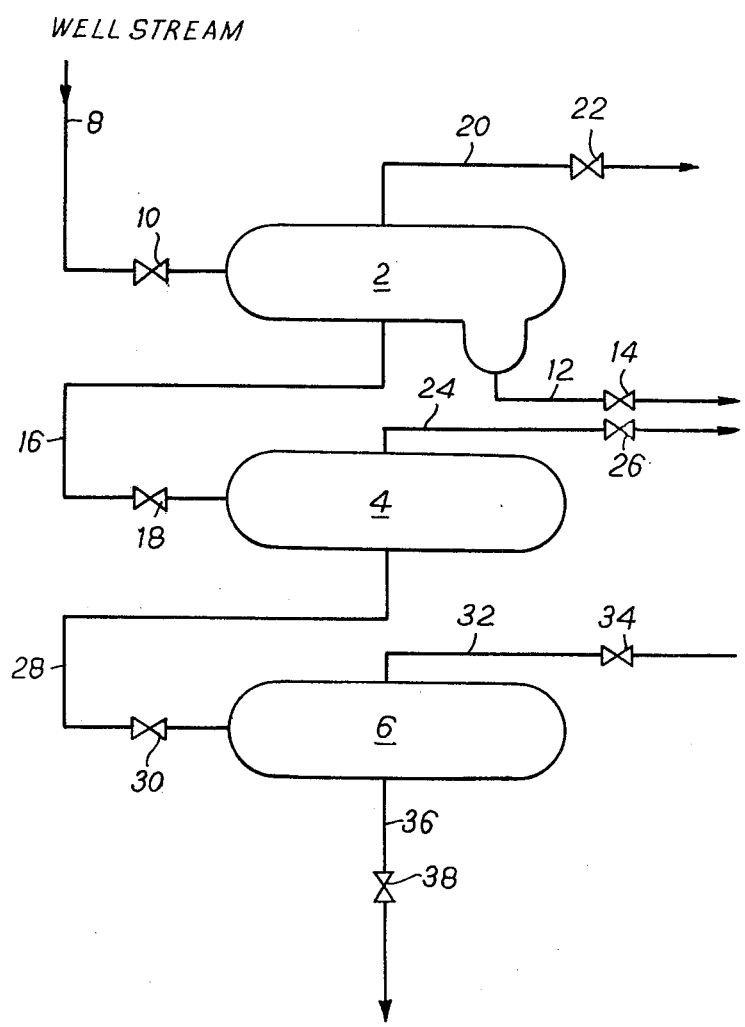
FIG. 1 illustrates an embodiment of the prior art.

In a comparative Example, a stream having a composition corresponding to a full well stream crude from an off-shore oil well in the North Sea was separated using the 3-stage flash separation unit of FIG. 1 to recover an 11–13 Reid Vapor Pressure crude as the liquid fraction from the low pressure separation stage. The stream was supplied to the unit through pipeline 8 at a pressure of 5000 psia and a temperature of 200° F. The unit operated with the following pressures and temperatures

| STAGE | PRESSURE (psia) | TEMPERATURE (° F) |
|---|---|---|
| High pressure (2) | 250 | 150 |
| Medium pressure (4) | 60 | 130 |
| Low pressure (6) | 16 | 110 |

The compositions and rates of flow of the fractions in pipelines 8, 16, 20, 24, 28, 32 and 36 are set out below

| | Pipeline 8 | | Pipeline 16 | |
|---|---|---|---|---|
| Composition | moles/hour | mol fraction | moles/hour | mol fraction |
| $N_2$ | 4.5000 | .0045 | .7463 | .0009 |
| $CO_2$ | 4.5000 | .0045 | 2.2500 | .0026 |
| $C_1$ | 128.1999 | .1282 | 42.1467 | .0484 |
| $C_2$ | 51.1000 | .0511 | 34.3186 | .0394 |
| $C_3$ | 83.7000 | .0837 | 70.4237 | .0809 |
| iso-$C_4$ | 16.4000 | .0164 | 14.9735 | .0172 |
| n-$C_4$ | 51.8000 | .0518 | 48.2744 | .0554 |
| iso-$C_5$ | 19.6000 | .0196 | 18.9094 | .0217 |
| n-$C_5$ | 27.1000 | .0271 | 26.3005 | .0302 |
| $C_6$ | 55.9000 | .0559 | 55.2257 | .0634 |
| $C_{7+}$ | 557.2002 | .5572 | 557.1978 | .6399 |
| TOTALS | 1000.0000 | 1.0000 | 870.7666 | 1.0000 |

| | Pipeline 20 | | Pipeline 24 | |
|---|---|---|---|---|
| Composition | moles/hour | mol fraction | moles/hour | mol fraction |
| $N_2$ | 3.7537 | .0290 | .7067 | .0077 |
| $CO_2$ | 2.2500 | .0174 | 1.6778 | .0183 |
| $C_1$ | 86.0532 | .6659 | 35.6811 | .3883 |
| $C_2$ | 16.7813 | .1299 | 19.5052 | .2123 |
| $C_3$ | 13.2763 | .1027 | 21.6985 | .2361 |
| iso-$C_4$ | 1.4265 | .0110 | 2.5836 | .0281 |
| n-$C_4$ | 3.5256 | .0273 | 6.3268 | .0689 |
| iso-$C_5$ | .6905 | .0053 | 1.2052 | .0131 |
| n-$C_5$ | .7995 | .0062 | 1.4113 | .0154 |
| $C_6$ | .6742 | .0052 | 1.0865 | .0118 |
| $C_{7+}$ | .0018 | .0000 | .0012 | .0000 |
| TOTALS | 129.2325 | 1.0000 | 91.8851 | 1.0000 |

| | Pipeline 28 | | Pipeline 32 | |
|---|---|---|---|---|
| Composition | moles/hour | mol fraction | moles/hour | mol fraction |
| $N_2$ | .0395 | .0001 | .0388 | .0006 |
| $CO_2$ | .5722 | .0007 | .5086 | .0080 |
| $C_1$ | 6.4655 | .0083 | 6.1155 | .0957 |
| $C_2$ | 14.8124 | .0190 | 11.4390 | .1790 |
| $C_3$ | 48.7252 | .0626 | 24.8654 | .3891 |
| iso-$C_4$ | 12.3898 | .0159 | 3.9483 | .0618 |
| n-$C_4$ | 41.9476 | .0539 | 10.3762 | .1624 |
| iso-$C_5$ | 17.7042 | .0227 | 2.2494 | .0352 |
| n-$C_5$ | 24.8891 | .0320 | 2.4487 | .0383 |
| $C_6$ | 54.1392 | .0695 | 1.9141 | .0300 |
| $C_{7+}$ | 557.1963 | .7154 | .0011 | .0000 |
| TOTALS | 778.8811 | 1.0000 | 63.9052 | 1.0000 |

| | Pipeline 36 | |
|---|---|---|
| Composition | moles/hour | mol fraction |
| $N_2$ | .0007 | .0000 |
| $CO_2$ | .0636 | .0001 |
| $C_1$ | .3501 | .0005 |
| $C_2$ | 3.3734 | .0047 |
| $C_3$ | 23.8598 | .0334 |
| iso-$C_4$ | 8.4415 | .0118 |
| n-$C_4$ | 31.5714 | .0442 |
| iso-$C_5$ | 15.4547 | .0216 |
| n-$C_5$ | 22.4404 | .0314 |
| $C_6$ | 52.2251 | .0730 |
| $C_{7+}$ | 557.1948 | .7793 |
| TOTAL | 714.9756 | 1.0000 |

The same stream was then subjected to separation in the 3-stage flash distillation unit with gas recycle, illustrated in FIG. 2, to recover a crude having the same Reid Vapor Pressure. The operating temperatures and pressures of the stages 42, 46 and 50 were the same as those of the high pressure stage 2, medium pressure stage 4 and low pressure stage 6 of the unit illustrated in FIG. 1.

In this process, 80% of the gas recovered from the medium pressure stage 46 in pipeline 136 was recycled through pipeline 140, compressor 56 and pipeline 142 to mixing device 44 and thence back to the high pressure stage 42, and the remaining 20% passed to pipeline 146, and all of the gas recovered from the low pressure stage 50 was recycled through pipeline 158, compressor 54 and pipeline 160 to mixing device 48 and thence back to the medium pressure stage 46.

The gas recovered from compressor 56 in pipeline 142 was at 230 psia and 100° F. and the gas recovered from compressor 54 in pipeline 160 was at 50 psia and 100° F. Mixing device 44 increased the pressure of the gas in pipeline 142 by a further 20 psi to the pressure of the higher pressure separation stage and mixing device 48 increased the pressure of the gas in pipeline 160 by a further 10 psi to the pressure of the medium pressure separation stage.

The compositions and rates of flow of the fractions in pipelines 100, 108, 130, 116, 136, 142, 146, 124 and 154 are set out below

| Compositions | Pipeline 100 | | Pipeline 108 | |
|---|---|---|---|---|
| | moles/hour | mol fraction | moles/hour | mol fraction |
| $N_2$ | 4.5000 | .0045 | .5794 | .0006 |
| $CO_2$ | 4.5000 | .0045 | 2.6320 | .0027 |
| $C_1$ | 128.1999 | .1282 | 39.1771 | .0407 |
| $C_2$ | 51.1000 | .0511 | 52.6982 | .0547 |
| $C_3$ | 83.7000 | .0837 | 120.3280 | .1250 |
| iso-$C_4$ | 16.4000 | .0164 | 21.1448 | .0220 |
| n-$C_4$ | 51.8000 | .0518 | 62.2752 | .0647 |
| iso-$C_5$ | 19.6000 | .0196 | 21.1318 | .0219 |
| n-$C_5$ | 27.1000 | .0271 | 28.7712 | .0299 |
| $C_6$ | 55.9000 | 0.0559 | 56.8823 | .0591 |
| $C_{7+}$ | 557.2002 | .5572 | 557.1990 | .5787 |
| TOTALS | 1000.0000 | 1.0000 | 962.8191 | 1.0000 |

| Compositions | Pipeline 116 | | Pipeline 124 | |
|---|---|---|---|---|
| | moles/hour | mol fraction | moles/hour | mol fraction |
| $N_2$ | .0149 | .0000 | .0001 | .0000 |
| $CO_2$ | .4080 | .0005 | .0237 | .0000 |
| $C_1$ | 3.2465 | .0037 | .0891 | .0001 |
| $C_2$ | 17.5800 | .0202 | 2.2306 | .0030 |
| $C_3$ | 92.4807 | .1062 | 29.6909 | .0403 |
| iso-$C_4$ | 21.6961 | .0249 | 11.1312 | .0151 |
| n-$C_4$ | 66.6828 | .0766 | 40.0034 | .0543 |
| iso-$C_5$ | 22.8974 | .0263 | 17.6765 | .0240 |
| n-$C_5$ | 30.4696 | .0350 | 24.9458 | .0338 |
| $C_6$ | 58.3280 | .0670 | 54.2902 | .0736 |
| $C_{7+}$ | 557.1982 | .6397 | 557.1956 | .7557 |
| TOTALS | 871.0020 | 1.0000 | 737.2773 | 1.0000 |

| Compositions | Pipeline 130 | | Pipeline 136 | |
|---|---|---|---|---|
| | moles/hour | mol fraction | moles/hour | mol fraction |
| $N_2$ | 4.3843 | .0204 | .5794 | .0026 |
| $CO_2$ | 3.9595 | .0184 | 2.6115 | .0116 |
| $C_1$ | 120.3347 | .5598 | 39.1135 | .1744 |
| $C_2$ | 38.7657 | .1803 | 50.5414 | .2253 |
| $C_3$ | 34.1255 | .1587 | 89.9097 | .4008 |
| iso-$C_4$ | 3.0305 | .0141 | 9.8771 | .0440 |
| n-$C_4$ | 6.8420 | .0318 | 21.9569 | .0979 |
| iso-$C_5$ | 1.1609 | .0054 | 3.4030 | .0152 |
| n-$C_5$ | 1.3157 | .0061 | 3.7719 | .0168 |
| $C_6$ | 1.0447 | .0049 | 2.5555 | .0114 |
| $C_{7+}$ | .0027 | .0000 | .0025 | .0000 |
| TOTALS | 214.9660 | 1.0000 | 224.3223 | 1.0000 |

| Compositions | Pipeline 142 | | Pipeline 146 | |
|---|---|---|---|---|
| | moles/hour | mol fraction | moles/hour | mol fraction |
| $N_2$ | .4635 | .0026 | .1159 | .0026 |
| $CO_2$ | 2.0892 | .0116 | .5223 | .0116 |
| $C_1$ | 31.2908 | .1744 | 7.8227 | .1744 |
| $C_2$ | 40.4331 | .2253 | 10.1083 | .2253 |
| $C_3$ | 71.9277 | .4008 | 17.9819 | .4008 |
| iso-$C_4$ | 7.9017 | .0440 | 1.9754 | .0440 |
| n-$C_4$ | 17.5655 | .0979 | 4.3914 | .0979 |
| iso-$C_5$ | 2.7224 | .0152 | .6806 | .0152 |
| n-$C_5$ | 3.0175 | .0168 | .7544 | .0168 |
| $C_6$ | 2.0444 | .0114 | .5111 | .0114 |
| $C_{7+}$ | .0020 | .0000 | .0005 | .0000 |
| TOTALS | 179.4579 | 1.0000 | 44.8645 | 1.0000 |

Pipeline 154

| Compositions | moles/hour | mol fraction |
|---|---|---|
| $N_2$ | .0147 | .0001 |
| $CO_2$ | .3843 | .0029 |
| $C_1$ | 3.1574 | .0236 |
| $C_2$ | 15.3494 | .1148 |
| $C_3$ | 62.7896 | .4695 |
| iso-$C_4$ | 10.5649 | .0790 |
| n-$C_4$ | 26.6794 | .1995 |
| iso-$C_5$ | 5.2209 | .0390 |
| n-$C_5$ | 5.5238 | .0413 |
| $C_6$ | 4.0378 | .0302 |
| $C_{7+}$ | .0023 | .0000 |
| TOTALS | 133.7246 | 1.0000 |

It will be seen that by means of the present invention, the proportion of the feed stream that is recovered as liquid from the low pressure separator is increased from approximately 71.4% to 73.7% of the feed, expressed in moles/hr, and that the mole fraction of $C_3$ and $C_4$ hydrocarbons retained in this liquid is increased by approximately 20% and 24% respectively. Also, the amount of methane and $C_2$ recovered as high pressure gas (from the high pressure separator) is increased by nearly 40% and approximately 130%, respectively. It will also be seen that the amount of valuable gas recovered at high pressure is increased from approximately 129 moles/hr to approximately 215 moles/hr.

The power required to drive the compressors 54 and 56 is approximately 936 b.h.p. This can be provided comfortably by means of, for example, gas turbines fuelled e.g. by high pressure gas from pipeline 130/134. Alternatively or additionally, where the well stream is gassy and at high pressure, all or part of the power may be generated by expanding the gases released in the separation system in turbo-expanders.

EXAMPLE 2

This Example illustrates the application of the arrangement of FIG. 3 to produce a crude LPG, pipeline gas and plant fuel gas from a well-stream crude.

The temperature and pressure conditions of the various apparatus features were as follows.

| Vessel | Pressure (psia) | Temperature (° F) |
|---|---|---|
| High Pressure Crude Separator 42 | 250 | 100 |
| Medium Pressure Crude Separator 46 | 75 | 100 |
| Low Pressure Crude Separator 50 | 15 | 100 |
| Crude LPG Separator 58 | 250 | 100 |
| Pipeline Gas Separator 60 | 248 | −40 |
| Plant Fuel Gas Separator 62 | 215 | 50 |

Using these conditions, and the feed composition shown below, the following product compositions and rates were obtained:

| COMPONENT | CRUDE OIL FEED (pipeline 100) | PIPELINE GAS PRODUCT (pipeline 172) | PLANT FUEL GAS PRODUCT (pipeline 178) | CRUDE LPG PRODUCT (pipeline 170) | OIL PRODUCT (pipeline 128) |
|---|---|---|---|---|---|
| | mole fraction | mole fraction | mole fraction | mole fraction | mole fraction |
| $N_2$ | .0032 | .0245 | .0020 | trace | trace |
| $CO_2$ | .0002 | .0012 | .0014 | .0002 | trace |
| $C_1$ | .1030 | .7451 | .2600 | .0208 | trace |
| $C_2$ | .0455 | .1881 | .4466 | .1392 | .0020 |
| $C_3$ | .0754 | .0389 | .2610 | .5122 | .0351 |
| iso-$C_4$ | .0196 | .0009 | .0107 | .0778 | .0174 |
| normal-$C_4$ | .0570 | .0012 | .0160 | .1728 | .0564 |
| iso-$C_5$ | .0262 | trace | .0012 | .0310 | .0308 |
| normal-$C_5$ | .0335 | trace | .0009 | .0307 | .0402 |
| $C_6$ | .0556 | trace | .0002 | .0152 | .0701 |
| $C_7^+$ | .5808 | trace | trace | trace | .7479 |

| COMPONENT | CRUDE OIL FEED (pipeline 100) | PIPELINE GAS PRODUCT (pipeline 172) | PLANT FUEL GAS PRODUCT (pipeline 178) | CRUDE LPG PRODUCT (pipeline 170) | OIL PRODUCT (pipeline 128) |
|---|---|---|---|---|---|
| Moles/hr | 1000.0 | 128.7 | 22.9 | 73.5 | 776.6 |

I claim:

1. In a process for the separation of a multi-component hydrocarbon mixture at superatmospheric pressure into a gaseous phase and a liquid phase by a multi-stage flash separation in which each stage operates at a lower pressure than the preceding stage, the feed to each of the separation stages after the first is provided by the liquid fraction recovered from the immediately preceding stage, and at least a part of the gaseous fraction recovered from a stage after the first stage is recompressed, recycled and in the gaseous phase mixed with the liquid feed to the preceding stage, the improvement wherein the recompression of said gaseous fraction part is effected by compression of said gaseous fraction part in compressor means and then by supplying said compressed fraction part in the gaseous phase and at a pressure lower than that of the preceding stage to the low pressure zone of ejector means in which said liquid feed to the preceding stage is expanded, and said gaseous fraction part and said liquid feed are intimately mixed in said ejector means.

2. A process as claimed in claim 1 in which the multi-stage flash separation comprises at least three flash separation stages, and a part of the gaseous fraction recovered from each stage after the first stage is subjected to said recompressing and recycling and is mixed with the liquid feed to the immediately preceding stage.

3. A process as claimed in claim 2 in which the multi-component hydrocarbon mixture is a well head stream.

4. A process as claimed in claim 3 in which the pressure of the first stage does not exceed 2000 psig.

5. A process as claimed in claim 4 in which the pressure does not exceed 1000 psig.

6. A process as claimed in claim 3 in which the well head stream contains $C_1$-$C_4$ hydrocarbons and a product gas stream rich in $C_1$ and suitable for use as a pipeline gas is recovered from the gaseous fraction recovered from the first separation stage.

7. A process as claimed in claim 6 in which the well head stream contains $C_1$-$C_4$ hydrocarbons and a product stream suitable for use as a crude LPG stream is provided from condensate formed by partially condensing a gas stream provided by at least one of the gaseous fractions recovered from a stage in the multi-stage flash separation after the first stage.

8. A process as claimed in claim 7 in which a further product stream having a composition lying between that of the gas stream suitable for use as a pipeline gas and the stream suitable for use as a crude LPG stream is separated from at least one of the gaseous fractions recovered from the stages of the multistage flash separation.

9. A process as claimed in claim 3 in which the recovery of the well head stream from the well is assisted by gas lift and wherein at least a portion of the gaseous fraction recovered from the second stage of the multi-stage flash separation, is compressed and employed in said gas lift and thereby recycled to the first stage of the multi-stage flash separation.

10. A process as claimed in claim 3 in which the well head stream in a wax-containing oil and the liquid feed to the last stage of the multi-stage separation is cooled below the cloud point of said wax by compressing, cooling and partially condensing at least a part of the gaseous fraction recovered from said last stage and injecting condensate so formed into said liquid feed.

11. A process as claimed in claim 3 which employs three separation stages with said recompression and recycle of gas from the second and third stages to mix with the liquid feeds to the first and second stages respectively.

12. A process as claimed in claim 11 in which a product stream suitable for use as a crude LPG stream is provided from condensate obtained by cooling and partially condensing gaseous fraction from the second stage after it has been compressed in said compressor means.

13. A process as claimed in claim 12 in which a product stream suitable for use as a pipeline gas is provided from the uncondensed gas remaining after cooling and partially condensing at least a portion of the gaseous fraction recovered from the first separation stage.

14. A process as claimed in claim 13 in which said cooling and partial condensation is effected by indirect heat exchange with a refrigerant stream formed by expanding condensate obtained by cooling and partially condensing gaseous fraction from the second stage after it has been compressed in said compressor means.

15. A process as claimed in claim 11 in which a product stream suitable as a fuel gas is provided from condensate obtained by cooling and partially condensing gas provided from the gaseous fraction recovered from the first separation stage.

16. A process as claimed in claim 15 in which at least a part of the energy required for said compression of said gaseous fraction part being recycled is provided by combustion of a fuel stream provided by said fuel gas.

17. A process as claimed in claim 11 in which at least a part of the energy required for said compression of said gaseous fraction part is provided by combustion of a fuel gas provided from the gaseous fraction recovered from the second separation stage.

18. A process as claimed in claim 1 in which a mixed liquefied petroleum gas is provided from condensate obtained by further compressing, cooling and partially condensing gas from the third separation stage which has been in said compressor means for recycle to the second stage.

19. A process as claimed in claim 18 in which fuel gas is provided from the uncondensed gas remaining after said partial condensation.

* * * * *